(12) United States Patent
Goldstein et al.

(10) Patent No.: US 9,387,815 B2
(45) Date of Patent: Jul. 12, 2016

(54) APPARATUS FOR COLLECTION OF DEBRIS ESCAPING AROUND A VEHICLE TAILGATE

(71) Applicants: Kevin Goldstein, Kinnelon, NJ (US); Joseph D. Cassese, Upper Saddle River, NJ (US)

(72) Inventors: Kevin Goldstein, Kinnelon, NJ (US); Joseph D. Cassese, Upper Saddle River, NJ (US)

( * ) Notice: Subject to any disclaimer, the term of this patent is extended or adjusted under 35 U.S.C. 154(b) by 0 days.

(21) Appl. No.: 14/688,681

(22) Filed: Apr. 16, 2015

(65) Prior Publication Data

US 2015/0217704 A1    Aug. 6, 2015

Related U.S. Application Data

(63) Continuation-in-part of application No. 14/192,418, filed on Feb. 27, 2014, now Pat. No. 9,126,541.

(60) Provisional application No. 61/770,463, filed on Feb. 28, 2013.

(51) Int. Cl.
*B60P 1/28* (2006.01)
*B60R 13/01* (2006.01)
*B60P 1/26* (2006.01)

(52) U.S. Cl.
CPC . *B60R 13/01* (2013.01); *B60P 1/26* (2013.01); *B60P 1/286* (2013.01)

(58) Field of Classification Search
CPC .......... B60J 7/041; B60J 7/141; B65D 19/38; B65D 2519/00024; B65D 2519/00059; B65D 2519/00273; B65D 2519/00288; B65D 2519/00323; B65D 2519/00333; B65D 2519/00562; B65D 2519/00572; B65D 90/582
USPC ............ 296/183.2, 38, 51, 101, 181.6; 298/7, 298/23 R, 1 R, 23 MD, 38
See application file for complete search history.

(56) References Cited

U.S. PATENT DOCUMENTS

| | | |
|---|---|---|
| 2,679,335 A | 5/1954 | Bell |
| 2,682,975 A | 7/1954 | Stoner |
| 1,214,045 A | 1/1970 | Lightburn |
| 3,512,206 A | 5/1970 | Young |
| 3,833,255 A | 9/1974 | Logue |
| 4,317,592 A | 3/1982 | Newman et al. |
| 4,723,817 A | 2/1988 | Wallan |
| 4,772,072 A | 9/1988 | Vick, Jr. |
| 5,046,774 A | 9/1991 | Stockell et al. |
| 6,030,026 A * | 2/2000 | Vega ...................... B60P 3/341 135/88.13 |
| 6,929,329 B2 | 8/2005 | Kent et al. |
| 6,987,906 B2 | 1/2006 | Nakama et al. |
| 7,052,070 B1 * | 5/2006 | Simonin ............ B62D 33/0273 296/57.1 |
| 7,110,629 B2 | 9/2006 | Bjorkman et al. |
| 7,263,256 B2 | 8/2007 | Kim et al. |
| 7,454,102 B2 | 11/2008 | Keyser et al. |
| 7,526,170 B2 | 4/2009 | Kishima |
| 7,574,090 B2 | 8/2009 | Shimooka |
| 8,172,309 B1 * | 5/2012 | Weir ........................ B32B 7/12 296/183.1 |

(Continued)

*Primary Examiner* — Glenn Dayoan
*Assistant Examiner* — Sunsurraye Westbrook
(74) *Attorney, Agent, or Firm* — Banner & Witcoff, Ltd.

(57) ABSTRACT

A multi-panel cover includes end panels that connect first and second lateral panels. The lateral panels seat against the tailgate assembly of a truck body and are maintained in position by magnets incorporated into a lateral panel along the edges and between the side panels to form a pocket to collect debris that may otherwise escape through or around the tailgate of the vehicle. A peripheral sealing material such as an elastic cord or hook and loop seal may be positioned around the tailgate gap to augment sealing.

17 Claims, 5 Drawing Sheets

(56) References Cited

U.S. PATENT DOCUMENTS

| | | |
|---|---|---|
| 2004/0012041 A1 | 1/2004 | West et al. |
| 2004/0096152 A1 | 5/2004 | Nakama et al. |
| 2004/0114853 A1 | 6/2004 | Bjorkman et al. |
| 2005/0063637 A1 | 3/2005 | Mershon et al. |
| 2006/0105479 A1 | 5/2006 | Cave et al. |
| 2007/0253663 A1 | 11/2007 | Keyser et al. |
| 2007/0262327 A1 | 11/2007 | Shimooka |
| 2008/0085075 A1 | 4/2008 | Kishima |
| 2009/0263923 A1 | 10/2009 | Shimooka |
| 2012/0007382 A1* | 1/2012 | Keck ................ B60P 1/26 296/100.16 |

* cited by examiner

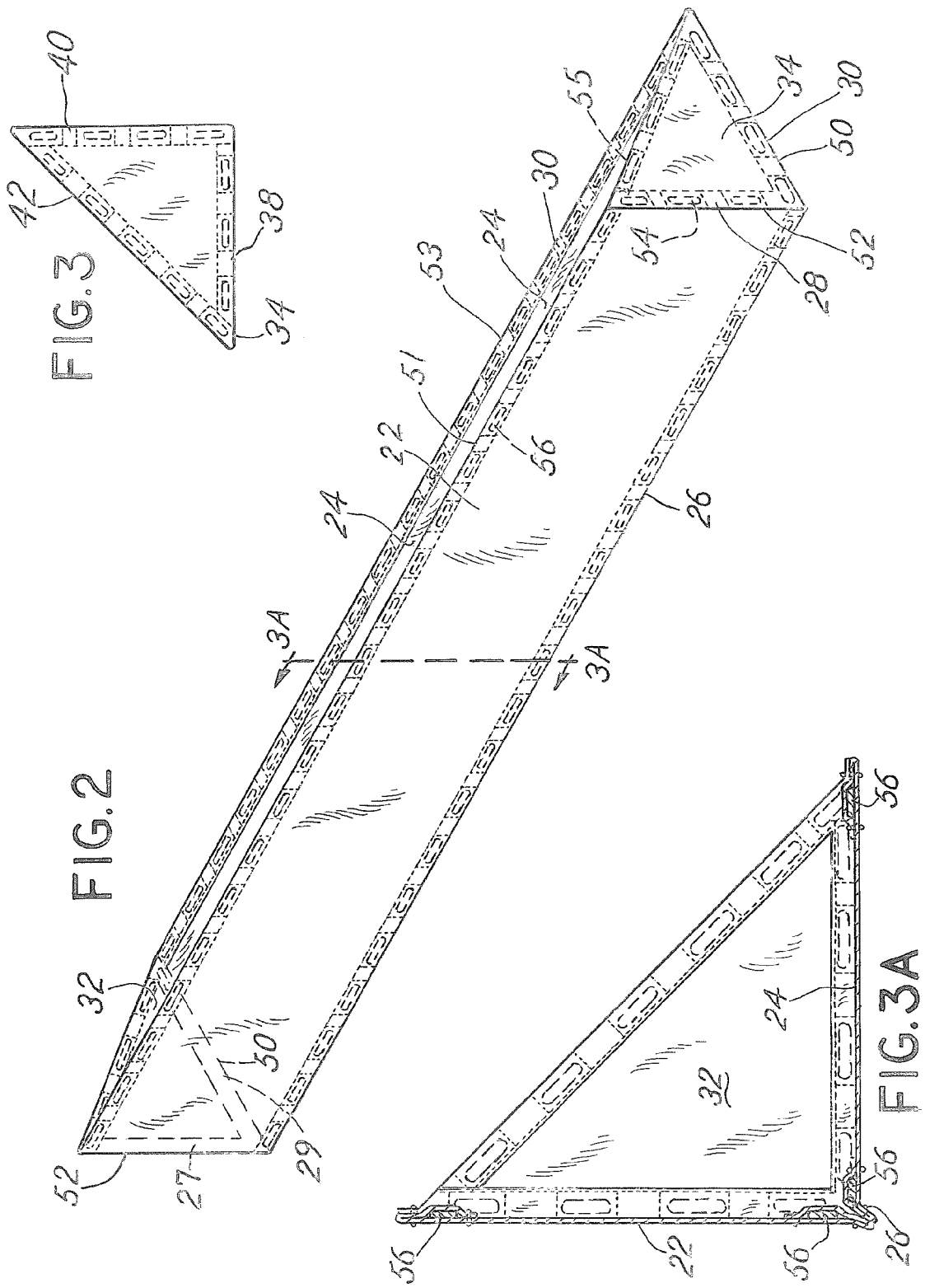

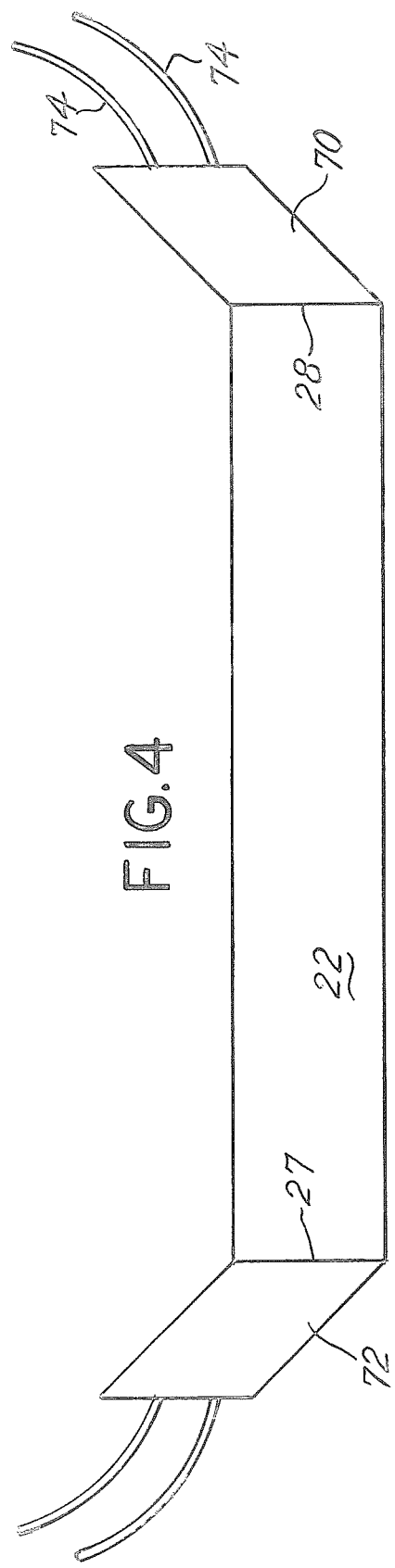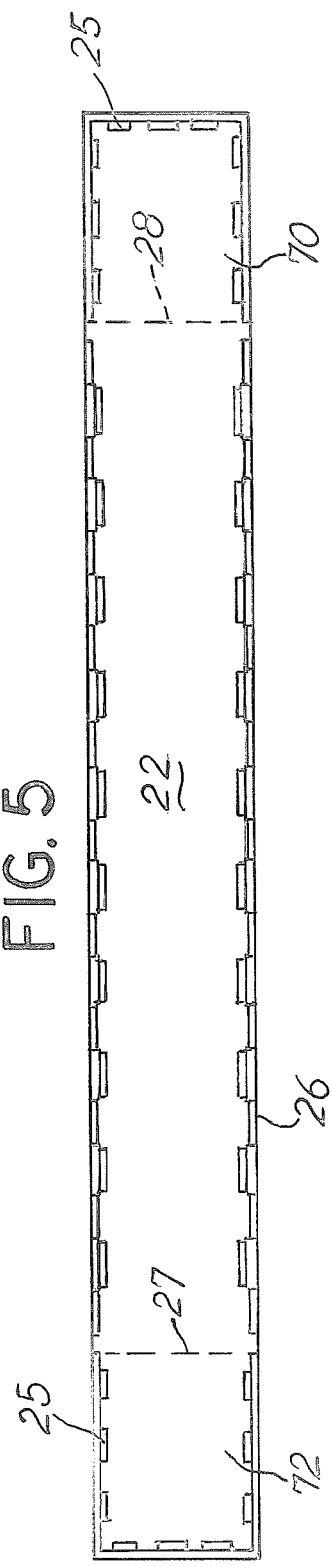

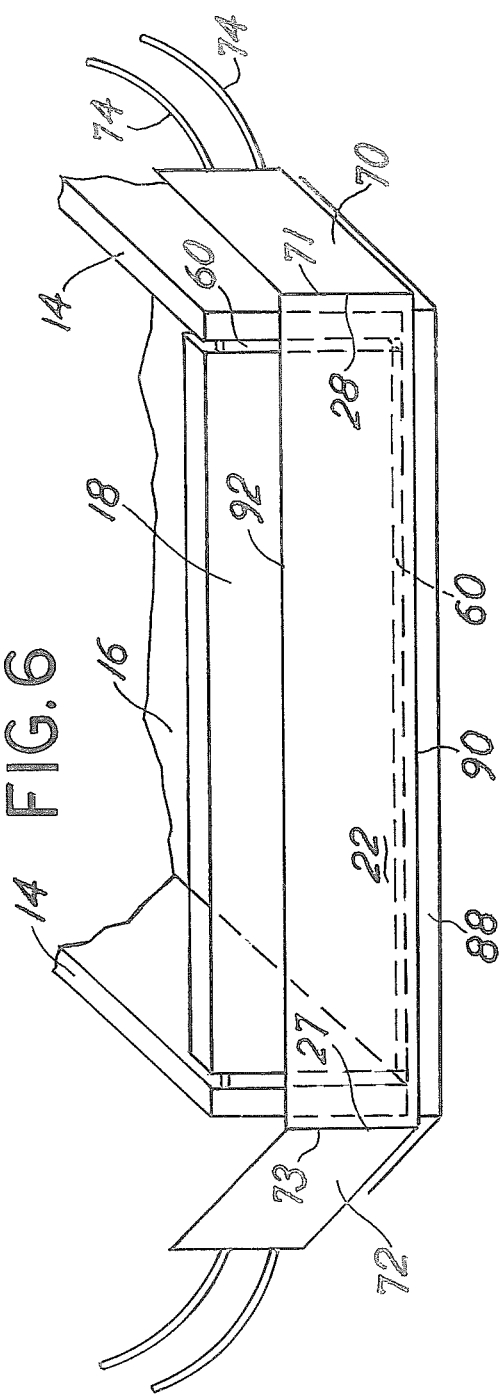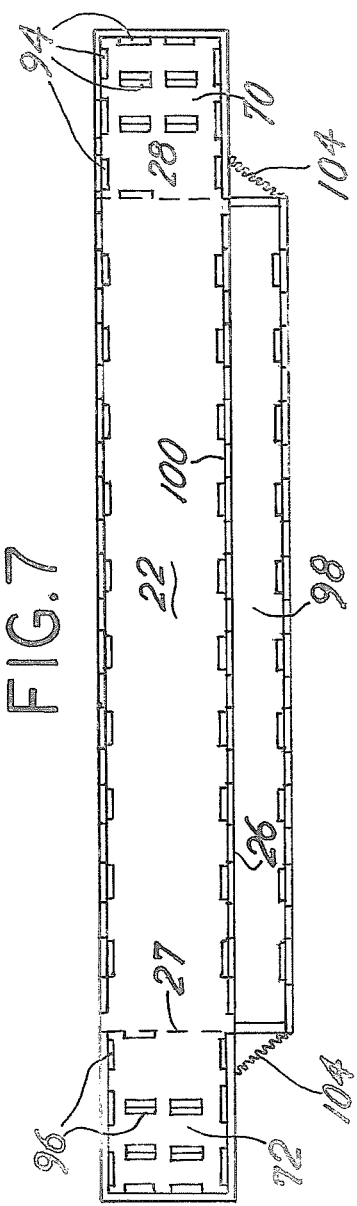

APPARATUS FOR COLLECTION OF DEBRIS ESCAPING AROUND A VEHICLE TAILGATE

CROSS REFERENCE TO RELATED APPLICATIONS

This is a continuation-in-part of utility application Ser. No. 14/192,418 filed Feb. 27, 2014 entitled "Apparatus for Collection of Debris Escaping Around a Vehicle Tailgate" incorporating by reference and claiming priority to provisional application Ser. No. 61/770,463 filed Feb. 28, 2013 entitled "Apparatus for Collection of Debris Escaping Around a Vehicle Tailgate".

BACKGROUND OF THE INVENTION

Briefly, the present invention relates to an apparatus for collection and retention of debris discharged or escaping around the tailgate of a vehicle such as a construction vehicle, garbage truck or the like.

Highway safety is a continuing concern. Among the aspects of highway safety is a problem associated with vehicles, such as construction vehicles and similar transportation vehicles, which include a bed for the carriage of various materials. Typically, such vehicles will include a truck bed with a tailgate mounted to side walls of the truck bed. The tailgate typically opens in order to enable placement of materials on the bed or to enable efficient discharge of the materials from the bed. Such vehicles, when travelling on highways, may, due to the irregularity of the highway surface, discharge debris as the tailgate is displaced by shaking or otherwise moves causing escape or discharge of debris and other materials. Such materials may also be discharged due to the flow of air over the vehicle cab and around the tailgate.

A solution to this problem is addressed, for example, by U.S. Pat. No. 3,833,255 entitled "Combined Load Cover and Windshield Protector for Dump Truck" incorporated herewith by reference. There are often legal requirements that such covers be provided for dump trucks and other vehicles. However, such vehicles may still exhibit a discharge of debris and other material. Issues of this nature have also been addressed by other patents such as U.S. Pat. No. 2,682,975 entitled "Dumping Box with Hinged Bottom Having Drip Catching Means" and U.S. Pat. No. 2,679,335 entitled "Dribble Gate", both of which are incorporated herewith by reference. Further developments of this nature are directed to the discharge of debris through the slot between a pivoting tailgate and a truck bed. U.S. Pat. No. 5,046,774 entitled "Debris Catcher" addresses such issues and it, too, is incorporated herewith by reference. Another effort in this regard is disclosed in U.S. Pat. No. 4,772,072 entitled "Dump Body Debris Catcher" incorporated herewith by reference.

Nonetheless, the cost of many of these solutions is significant and there has remained the desire to provide a lower cost, yet more highly efficient system to address the issue of escape of debris from dump trucks and other such vehicles. Additionally, a desirable solution to such a problem must consider the safety, the installation of a device, as well as the aspect of simplicity of use, storage of a device of this nature and application of the solution to preexisting truck configurations. Thus, the design for such an apparatus has presented an ongoing problem with respect to the aspects of safety, convenience and cost.

SUMMARY OF THE INVENTION

Briefly, the present invention comprises an assembly of fabric panels which are designed to fit over a section of the tailgate and a portion of the bed of a truck in a manner which covers the opening or seam between a tailgate, the side walls and the bed of the truck. The fabric may be a mesh-like canvas similar to the type of covering that is often used for covers placed over the open top of a vehicle bay or bed such as a dump truck or the like. Such covers typically are used to cover a load of debris or materials carried in the bed of the dump truck or transport vehicle. The mesh-like canvas material is permeable to air thus allowing the passage of air therethrough from wind currents and other air flow due to drafting of the vehicle as it is moving during its use as a transport vehicle. A feature of the invention comprises a design to prevent the device or apparatus described from being engaged by air flow and detached from the vehicle during travel of the vehicle thereby damaging its effectiveness.

Thus, it is an object of the invention to provide a cover which has a design capable of being easily maintained by attachment to a vehicle yet easily removed by a vehicle operator when necessary and reattached when necessary.

It is a further object of the invention to provide a debris collection device which is compact, which may be folded for easy storage, and which is rugged and inexpensive.

Yet another object and feature of the invention is to provide a cover which may be easily attached to multiple sizes of vehicle truck beds having various sizes and designs of tailgates associated with the truck bed.

Another object and feature of the invention is to provide a rugged yet lightweight and easily manipulated and adjustable cover device for collecting debris which might otherwise escape from the truck bed of a vehicle and thereby cause safety problems to arise.

These and other objects, advantages and features of the invention will be detailed in the description which follows that discusses and discloses an exemplary version of the subject matter of the invention.

BRIEF DESCRIPTION OF THE DRAWING

In the detailed description which follows, reference will be made to the drawing comprised of the following figures:

FIG. 2 is an isometric view of the apparatus for collecting and retaining debris as depicted in FIG. 1;

FIG. 3 is an elevation view of one side end panel of the cover of FIG. 2;

FIG. 3A is an elevation view of the opposite side end panel depicted in FIG. 3;

FIG. 4 is an exploded view of the component parts of an alternative embodiment of the invention;

FIG. 5 is an elevation view of the embodiment of FIG. 4 depicting additional features;

FIG. 6 is on isometric view of the embodiment of FIG. 4 depicting the attachment thereof to a truck bed;

FIG. 7 is a plan view of a variation of the embodiment of FIG. 4; and

DESCRIPTION OF EMBODIMENTS OF THE INVENTION

Figure 1:
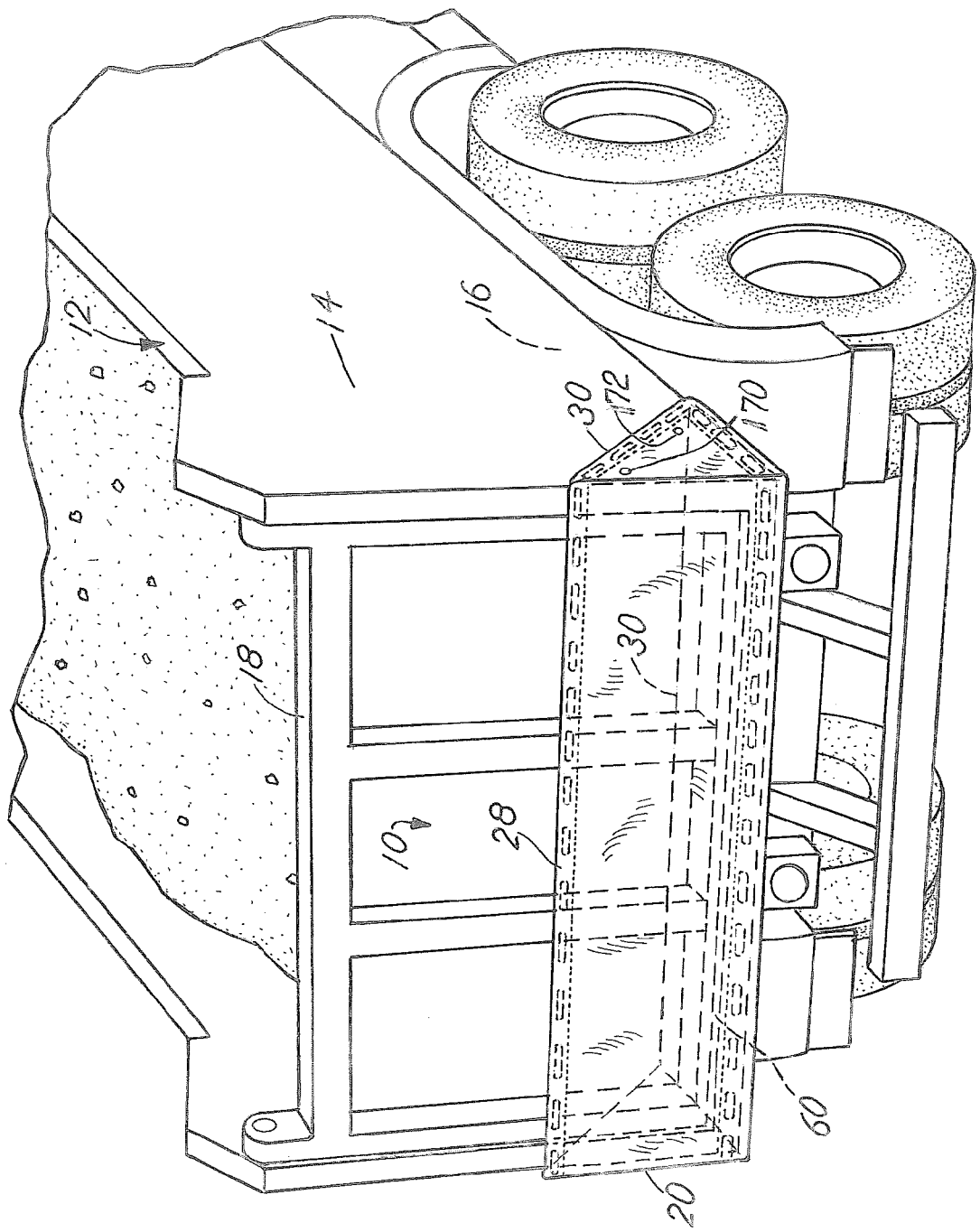
FIG. 1 is an isometric view depicting an example of the invention as incorporated and positioned over the tailgate and bed of a carriage vehicle.

Referring to the figures, FIG. 1 depicts a vehicle of the type which is a candidate for use of the apparatus of the present invention. Thus, a truck 10 having a vehicle bed assembly 12 with opposite, lateral side walls, such as walls 14, and an internal support bed platform 16 further includes an end tailgate 18. Typically, the tailgate 18 is pivotally mounted to side walls 14 and may swing about an attachment or connecting axis, may fold outwardly and/or downwardly, or may fold by means of hinges along one or the other of the vertical side walls 14. In some instances, the tailgate 18 may incorporate a mechanism which provides tilting and lowering so that a load carried on the internal bed platform 16 of the truck 10 may be placed on the gate as a platform and lowered in order to remove the contents from the truck bed 16. The subject matter of the present invention is designed for utilization with multiple styles of tailgate constructions such as those discussed.

The tailgate cover 20 of the invention includes a first generally vertical, end panel 22 and a second generally horizontal, end panel 24. The panels 22 and 24 are generally rectangular and include a common elongate generally horizontal seam or side 26. Vertical panel 22 includes parallel, lateral sides 27, 28. The horizontal panel 24 includes generally parallel lateral sides 29, 30. The panels 22 and 24 may be formed as separate elements which are stitched together along the seam or side 26 if desired. The panels 22 and 24 are typically of similar size and dimension. Typically, the side to side dimension of the panels 22 and 24 exceeds or is generally equal to the width of the bed 12 or the distance between the walls, such as walls 14 of the vehicle 10. This is an important aspect of the invention inasmuch as this aspect enables the apparatus or cover of the invention to be placed around the entire outside surface of the truck bed 12. The size and construction of the various panels enables reversal of the attachment of the apparatus embodiment depicted.

The cover further includes end side panels 32, 34 that are substantially identical in configuration. In other words, they are generally congruent in configuration and shape. For example, end panel 34 has the configuration of an isosceles triangle having side legs 38 and 40 which are equal and a base 42. In the embodiment depicted, the panels 32 and 34 are thus substantially congruent and are in the form of an isosceles triangle. However, other shapes may be utilized in order to accomplish the goals and features of the invention, for example, rectangular panels which are attached to a generally horizontal and a generally vertical end panel. Among those goals and features is the aspect of fitting over and around the sides of the truck bed 12 as depicted, for example, in FIG. 1.

The legs or sides 38, 40 of the isosceles triangle shaped end panels 32 and 34 are dimensioned to be substantially equal, respectively, to the side edges or side dimension of panel sides 27, 28, 29, 30. Thus, all of the component panels in the embodiment depicted are stitched together, though panels 22 and 24 may be formed from a single fabric sheet and folded along the longitudinal edge or seam 26 to form the configuration depicted in FIG. 2.

All of the seams or edges of the cover are folded over and stitched with encapsulated magnets, such as magnets 54 and 56 fitted into pockets in the folded over cover material of edges 51, 53. The magnets 54, 56 may be of any desired configuration or shape. In the embodiment depicted, the magnets 54, 56 comprise elongate members or bars which are in the range of 2 to 5 inches long and which are spaced from one another in the range of 2 to 5 inches around the periphery of all of the seams and edges of the cover.

The magnet retaining edges of the cover maintain the cover tightly in place upon the truck bed or body 12 as depicted in FIG. 1. Because of the number of magnets, their spacing, and the fact that those magnets are maintained in the seamed portions or portions which join the separate panels as well as in the lateral edges and side edges 50, 52, 55, 26 of the panels, ensures that multiple points of contact will be maintained between the cover and the truck body. Thus, the edges fit under the truck body or bed and are attached thereto as well as along the vertical walls 14 of the gate 18 as well as along side walls 14 and underside of bed platform 16.

The purpose of the cover is to fit over a gap 60 through which debris and material may discharge from the interior of the truck body 10. This gap 60 may vary in size thus resulting in the variance in particulates and materials which will sift therethrough or pass therethrough. Driving conditions may also affect the manner in which the gate 18 fits and the tolerance of the gate 18 may vary with respect to various types of vehicles. The cover of the present invention accommodates those variances. The cover, thus, retains debris which will fall or exit from the vehicle as a result of gravity, vibration and vehicle movement.

The positioning of the magnets and the number of magnets, their spacing and their configuration all become beneficial elements with respect to the cover. That is, their positioning and the other features associated with the magnets including the feature incorporating them within pockets or folded over portions of the cover material enable the cover to be molded tightly against the body of the vehicle and enable the cover to provide a universal fit to multiple types and styles of vehicles. Consequently, the lateral width or lateral dimension of the cover may vary somewhat, yet still cover the gap 60 in a meaningful and functional manner.

Another feature of the means of attachment is that the cover may be easily, manually attached, rigidly attached, adjustably attached and easily removed by manual operation. The magnets can be individually detached in a manual fashion. Additionally, because the cover is made from a flexible material, the cover may be folded into a compact configuration and the magnets can be utilized to maintain the cover in the desired and folded condition as a compact package that can be stored easily. Attachment of the cover to a truck body is also accommodated by the design. That is, the upper row of magnets and the upper edge 28 of the panel 22 may be easily attached as a first effort with respect to attachment of the cover to thereby position the cover in a manner which will enable positioning of the other elements or panels comprising the cover.

As an added feature of the invention, however, the triangular panels, such as panel 30, may include grommet openings, such as openings 70 and 72, to which a bungee cord or rope can be connected for retaining the cover in position. This may be useful with respect to those truck bodies which are manufactured from materials, such as aluminum, that are not magnetic. As a consequence, the cover of the present invention is capable of utilization with multiple types of truck bodies made from multiple materials. For example, as mentioned, aluminum bodies may utilize the cover. However, bodies which incorporate wood, for example, will also be able to utilize successfully the cover of the present invention. Thus, there are various options and alterations and changes and inclusions of alternative aspects of the invention and substitution of various components.

The assembly or cover is reversible. That is, either side of panels 22, 24 may be fitted against tailgate 18 and the seam 26 may be reversed in side to side alignment from left to right or vice-versa. Further, the magnets may be replaced since they may be retained in pockets in the fabric forming the cover by clips, or fasteners, or zippers.

FIGS. 4-7 illustrate further embodiments, aspects and features of the invention. In FIGS. 4 and 5 panels 70, 72 is affixed or attached respectively to the vertical side edge 27, 28 of the panel 22. The panels 70 and 72 may assume any desired shape. The embodiments depicted employ a generally rectangular shape for the panels 70, 72. Ropes or bungee cords or other attachment apparatus 74 may be affixed to the panels 70, 72 to augment the attachment of the cover to a vehicle. The panels 70, 72 may also include magnets.

FIG. 6 illustrates the manner of positioning of the generally rectangular elongate panel 27 relative to a tailgate 18 between side walls 14 of a truck bed 16. The tailgate 18 is attached to and typically pivots about an axis transverse to the truck bed side walls 14. Thus, when the bed 16 of a truck is filled with material and locked into position the cover assembly is positioned over lower part of the tailgate 18 and end of bed 16. However, due to vibration and movement of the component parts of the truck, debris such as sand, gravel and other materials may "escape between the pivotal tailgate 18, the side walls 14 and the truck bed 16". Placement of the substantially elongate panel 22 having a lower side edge 90 and an upper side edge 92 is thus effected and maintained by means of magnets as depicted by the array of magnets 25 in FIG. 5. The side or lateral end panels 70 and 72 which are attached to the panel 22 along the seams 71 and 73 are also attached to the outside of respective side walls 14. The side panels 70 and 72 thus are retained in a manner, such as described above, to tightly effect wrapping the fabric panel 22 and closure of the spacing 60 between the tailgate 18 and the walls 14 as well as the bottom bed panel 16 of the truck bed. It is noted that panel 22 may have a vertical dimension adequate to cover the entire tailgate. The vertical dimension may be postulated by evaluation of the material being transported. That is finer particulate materials may necessitate a panel which covers the entire tailgate or extends over the top of the tailgate.

Further as depicted in FIG. 7 the embodiment of FIGS. 4, 5, and 6 may have additional features. For example, the panel 70 may include an array of magnets such as magnets 94 and 96 for the side panels 70 and 72 respectively. The magnets 94, 96 are augmented for example, by bungee cords 74 or straps which hold the lateral side panels 70, 72 in position.

An additional feature is inclusion of an auxiliary flexible material panel 98 which is attached to the generally rectangular lateral panel 22 along a seam 100. The auxiliary panel 98 forms a generally coterminus seam 100 with bottom edge 90 of the panel 22. Further, the auxiliary panel 98 may include magnets 102 in an array which will facilitate placement of the auxiliary panel 98 to the bottom edge of bed 88 or folded under the bottom edge of the truck bed 88. Further, the auxiliary panel 98 may include elastic tethers 104 connecting the opposite ends thereof respectively to the lateral side panels 70 and 72 to facilitates positioning of panel 98.

Figure 8:
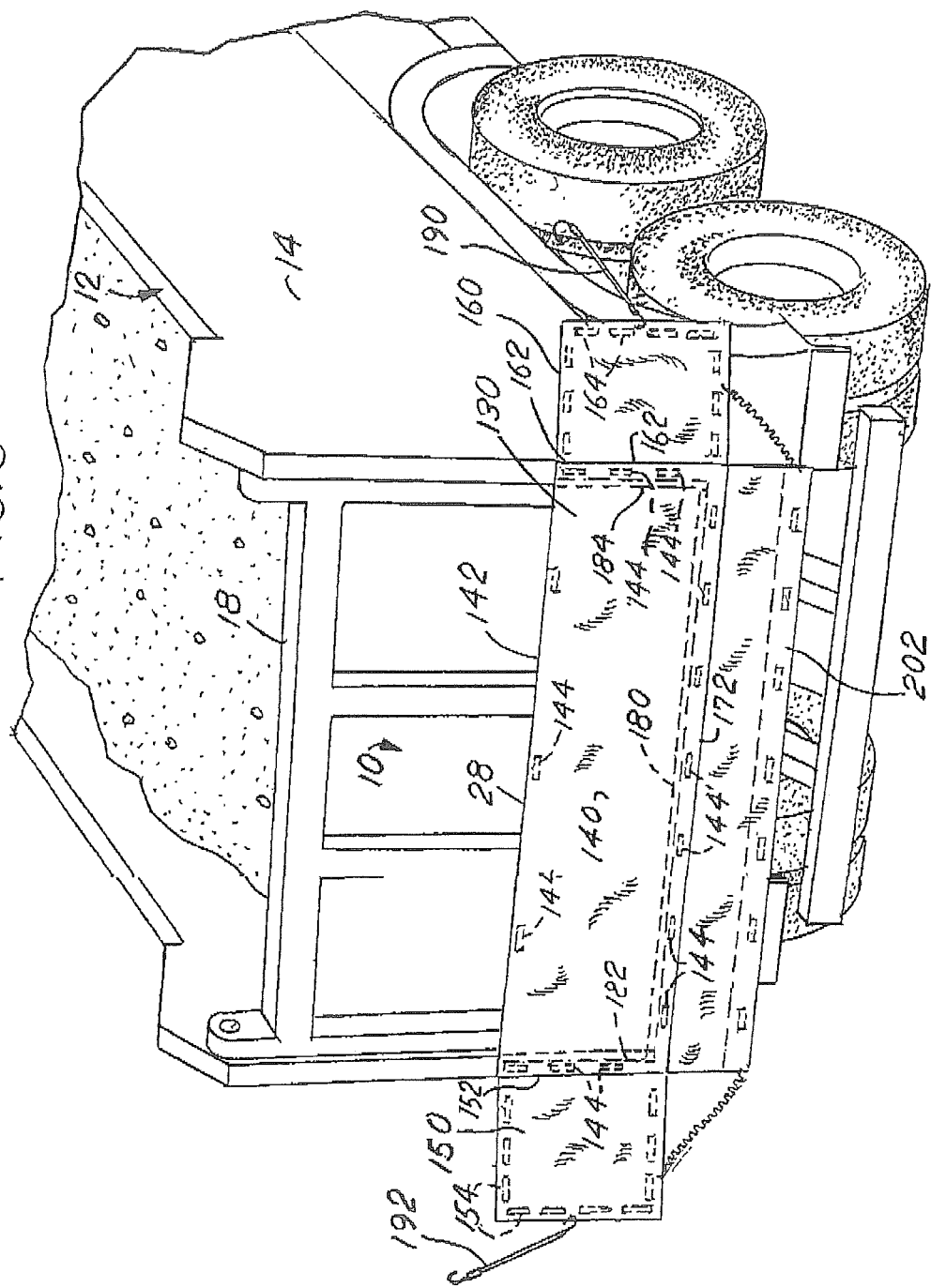
FIG. 8 is an isometric view of a variation of the embodiments depicted in FIGS. 1-7.

FIG. 8 depicts additional features or aspects of the embodiments previously depicted which enhance the capability to collect and retain debris that otherwise may leak from or escape from a dump truck dump body through a gap or slot 132 of the tailgate assembly. Thus, referring to FIG. 8, there is depicted a typical tailgate assembly 120 including a tailgate door 122 mounted on a truck body platform or bed 124 intermediate sidewalls 126 and 127. Typically, the door 122 is designed to pivot outwardly about a horizontal axis in order to release contents from the interior of the truck bed or dump body as the platform 124 is tilted.

When filling the truck dump body, the tailgate door 122 is closed and locked into position between side walls 126, 127. The body or bed is then filled. Next, a tailgate debris retention cover 130 may be positioned to cover the opening gap or slot 132 between the tailgate 122 and the platform 124 and the walls 126 and 127. The cover 130 assembly may be placed after filling the bed if desired or before filling the bed or dump body.

The cover or debris collection assembly 130 may have a configuration substantially like any one of the embodiments depicted in the preceding figures. For example, panels, as depicted in FIG. 7, may be utilized. However, as depicted in FIG. 8, various additional features may be included in the debris collection assembly device or cover 130. Thus, the representative device includes a first lateral, rectangular panel 140 having a top side or edge 142 extending substantially between the outside faces of opposed walls 126 and 127. First panel 140 includes a series of magnetic elements or magnets 144 in the form of bars spaced along the top edge 142 typically encapsulated within the fabric material comprising the first lateral panel 140. First lateral panel 140 further includes a bottom side or edge 172 and opposite first and second side edges 152 and 162 respectively.

A first side panel 150 is joined to panel 140 along a seam at edge 152 bonding panel 150 to first lateral panel 140. Panel 150 includes an array of magnetic elements or magnets 154. Likewise, a second edge panel 160 is joined to the first lateral panel 140 along a seam at edge 162. Multiple magnetic elements 164 are arrayed and retained in pockets or sleeves, by way of example, in the panel 160. The magnetic elements 164 typically form a pattern along the periphery or boundary of the panel 160. However, various arrays of magnetic elements may be adopted in side panels 150, 160.

An optional auxiliary or second lateral panel 202 may be attached to the first panel 140 along a seam at bottom edge 172 and may include an array of magnetic, spaced elements 144. Additional magnetic elements 144 are located around the periphery or sides forming the generally rectangular first lateral panel 140 along the lateral side 152 seam as well as the side 162 seam and side 172 seam along the lower edge of the first lateral panel 140. The arrays effectively seat and at least partially seal the panel 140 over opening or gap 132 around tailgate 122 when cover 130 is appropriately positioned on the truck bed.

An important addition to the embodiment depicted in FIG. 8 is the inclusion of a sealing strip or gasket positioned just inside the periphery of aligned magnetic elements 144 on or in the lateral panel 144. The gasket extends around at least portions of the periphery of panel 140 as depicted in the drawing. Thus, a gasket assembly 180 is positioned adjacent the magnetic elements 144 which are, in turn, positioned in spaced relationship along the seam 172. The gasket 180 includes vertical or lateral side sections 182 and 184, again generally inside the boundary defined by the array of magnetic elements 144 along the seams 152 and 162. The gaskets 180, 182, 184 may comprise an elastic or rubberized material. The gasket material, in essence, provides a seal between the inside face of the fabric comprising the panel 140 and the surface of the platform 124 and side walls 126, 127 of the bed of the truck body. That is, the magnets 144 seat the panel 140 against the truck floor or bed 124 and side walls 126, 127. The gasket 180, 182, 184 further effects a seal of panel 140 against floor or bed 124 and side walls 126, 127.

As an alternative construction, Velcro type material may be positioned so that the gripping surface thereof is opposed to a compatible and alignable strip of Velcro material 180A, 182A and 184A which have been placed on the truck platform 124 and side walls 126, 127 of the truck bed. Thus, the Velcro hook and loop gripping material will include an adhesive bonding surface seated on the inside face of panel 140. A Velcro hook and loop strip, having adhesive material as backing, may be easily attached to the truck bed platform 124 and side walls. Engagement of the hook and loop strips on the lateral panel 140 with the strip adhered to the truck bed and walls will secure the lateral panel 140 sealed in place and retained in that position augmented by the force of the magnets holding panel 140 in place.

An advantage of this construction is the improved sealing capability associated with the design. Additionally, major structural or other changes to the tailgate are unnecessary. Thus, hooks, bolts, and other fastening devices need not be attached to the truck body. The magnets 144, 154, 164 hold the panels 140, 150, 160 in place and the rubber like strip 180, 182, 184 or Velcro hook and loop material interlocking strips provide additional sealing of the cover 140. The side panels 150, 160 are held in place by magnets 144 and may be supplemented, for example, by elastic bungee cords, 190, 192, for example, attaching the panels 150, 160 in place. Alternatively or in addition, bungee cords or rope may be used to attach the side panels 150, 160 in place avoiding the use of magnets.

The application and utilization of sealing strips, especially positioned on the inside perimeter of the magnetic elements, thus provides an additional effective sealing arrangement with respect to the embodiments depicted. That is, the embodiment of FIG. 1 as well as the other embodiments depicted in the disclosure may incorporate the sealing concepts described. An aspect of the described arrangement is that the lateral extent or dimension of the lateral panel 140 may exceed the outside surface spacing of side walls 126, 127. Nonetheless, the cover or collection device will function since one or both ends of the panel 140 may be folded over the outside face of the side walls 126, 127. Thus, the cover 130 will be enabled to accommodate various tailgate 122 widths and side wall 126, 127 spacings without the necessity of reconfiguring the cover 130 or adding or removing external fastening elements or hooks or bolts on the side walls 126, 127.

Similar features may be incorporated in an auxiliary panel 202 affixed to the first lateral panel 140 along the lower or bottom side 172 by including multiple magnets 144 arranged around the periphery. Thus, the magnets 144 and the sealing materials 180 typically are positioned in a manner which seals the opening or slot or gap 132 existing between a tailgate 122 and the truck bed 124 and side walls 126, 127. Use of flexible fabric facilitates ease of adjustment of the cover assembly 130 to accommodate various sizes and shapes of lift gates and truck body bed and wall configurations. As a consequence, a minimal number of standard size covers may be utilized on variable truck bed designs.

The cover 130 of the various embodiments may be effectively used with various tailgate assembly designs as is not necessarily limited to a tailgate assembly as depicted in FIGS. 1 and 8 wherein the tailgate closure panel pivots about a generally horizontal axis. Thus, the cover 130 may be sized and shaped to fit over the gap or slot between a closure panel or panels mounted on the side walls of the truck bed or pivotal about a generally horizontal axis to the truck bed. By appropriately sizing the first lateral panel and the other panels as well as the position of the magnetic elements and sealing gasket of a cover 130, a single size cover 130 may be manipulated to seat and seal a gap or slot of multiple sizes and designs of a tailgate assembly.

Multiple variations of the cover or collection assembly are possible. Features which are considered to be integral to the construction is the employment of multiple individual magnets in various arrays incorporated in the panels especially along the edges of the panels so that the cover or device can be utilized with multiple truck bed configurations and designs. For example, the two or more panels may be formed from a single sheet of material folded and formed to define a boundary or seam at the juncture of panels. Magnets may be encapsulated in pockets formed on the panels or adhered the panels with an appropriate adhesive or bonding material. Tethers such as bungee cords may easily augment the cover construction. A sealing material such as a rubber seal or hook and loop material may be positioned on the inside face of the cover or device to effectively seal the cover to collect debris. Thus, while there has been set forth a preferred embodiment of the invention, the invention is to be limited only by the following claims and equivalence thereof.

What is claimed is:

1. Apparatus for collection and retention of debris discharged through a gap of a closed tailgate of a vehicle body, said gap located between said tailgate and said vehicle body, said apparatus comprising:

a cover assembly including a flexible, fabric, generally rectangular, first lateral panel, said first lateral panel having a top edge, a bottom edge, a first side edge and a second opposite side edge extending upwardly from the bottom edge, said first and second side edges laterally spaced a longitudinal, first side edge to second side edge dimension whereby said first lateral panel is capable of extending over and cover a said tailgate gap between said tailgate and said vehicle body;

said cover assembly further including first and second flexible side panels, said first side panel having a side joined to said first lateral side edge of said first lateral panel, said second side panel having a side joined to said second lateral side edge of said first lateral panel;

whereby the said first lateral panel bottom edge and said first lateral panel first and second side edges in combination define a boundary section said boundary section extending along said gap along the lateral panel bottom edge and the first and second side edges of said first lateral panel;

said boundary section including multiple, spaced, magnetic fastening elements attached thereto whereby the first lateral panel forms a cover capable of fitting over said gap retained on said truck body by said magnetic fastening elements; and a sealing element in the boundary section intermediate the magnetic elements and the gap for generally sealing the first lateral panel to the vehicle body.

2. The assembly of claim 1 wherein the sealing element comprises a gasket material.

3. The assembly of claim 1 further including a sealing element applied to said vehicle body generally in alignment with a sealing element positioned on said first lateral panel.

4. The assembly of claim 1 wherein said first and second side panels further include an array of magnetic fastening elements capable of attachment of the side panels to the vehicle body.

5. The apparatus of claim 1 wherein said longitudinal dimension approximates a lateral dimension of a truck bed body having a tailgate.

6. The apparatus of claim 1 wherein said first and second side panels are selected from the group consisting of a generally isosceles triangle and a generally rectangular panel.

7. The apparatus of claim 1 wherein said magnetic elements comprise discrete magnets at least partially encapsulated in the boundary section of the first lateral panel.

8. The apparatus of claim 1 further including auxiliary truck body attachment elements affixed to said first and second side panels.

9. The apparatus of claim 8 wherein said auxiliary attachment elements comprise one or more elements selected from the group consisting of magnetic elements, straps, ropes, cords, and bungee cords fastened to at least one of said side panels.

10. The apparatus of claim 1 further including an auxiliary second flexible lateral panel affixed along the bottom side edge of the first generally rectangular panel, said second panel joined to said first lateral panel along a generally linear seam extending at least partially between the first and second side edges of said first lateral panel, said auxiliary panel including one or more magnetic elements, said auxiliary panel foldable along said bottom side of the first lateral panel and capable of attachment to said vehicle body.

11. The apparatus of claim 10 including attachment elements for attaching said auxiliary panel to said vehicle body comprising one or more elements selected from the group considering of magnetic elements straps, ropes, cords, magnets and bungee cords.

12. The apparatus of claim 1 further including an auxiliary flexible fabric panel having an edge affixed to the bottom side edge of the first generally rectangular lateral panel along a linear seam, said linear seam extending substantially between the generally parallel lateral side edges of said first lateral panel, said auxiliary panel including a plurality of magnetic elements, said auxiliary panel foldable along said linear seam whereby the fabric panels are capable of being fitted and retained over a said tailgate opening of a said tailgate assembly by said magnetic elements.

13. The apparatus of claim 10 including a tether connecting the auxiliary panel and the side panels.

14. The apparatus of claim 10 wherein said auxiliary panel includes a peripheral boundary with an array of multiple, spaced magnetic elements along at least a portion of said auxiliary panel boundary.

15. The apparatus of claim 10 wherein said auxiliary panel further includes an array of multiple, spaced magnetic elements.

16. The apparatus of claim 10 further including multiple, spaced magnetic elements incorporated in at least one side panel.

17. The apparatus of claim 1 wherein said first lateral panel includes multiple magnetic elements along the top edge.

* * * * *